United States Patent [19]

Wang

[11] Patent Number: 4,627,186

[45] Date of Patent: Dec. 9, 1986

[54] AUTOMATIC FISHING MACHINE

[76] Inventor: Jeng-Maw Wang, P.O. Box 10160, Taipei, Taiwan

[21] Appl. No.: 797,414

[22] Filed: Nov. 12, 1985

[51] Int. Cl.$^4$ ............................................. A01K 97/12
[52] U.S. Cl. ......................................................... 43/16
[58] Field of Search .................................. 43/15, 16, 17

[56] References Cited

U.S. PATENT DOCUMENTS

| 3,283,438 | 11/1966 | Wagner | 43/17 |
| 3,568,352 | 3/1971 | Hill | 43/17 |
| 4,384,425 | 5/1983 | Lemons | 43/17 |

FOREIGN PATENT DOCUMENTS 2100101 12/1982 United Kingdom .................... 43/17

Primary Examiner—M. Jordan

[57] ABSTRACT

An automatic fishing machine includes a casing, an electromagnet switch having a micro switch wound by a fishing wire during fishing, a rod clamp resiliently clamping the grip of a fishing rod, and tensioned by a tension spring formed under the clamp, an alarm and a fulcrum rod formed on the front portion of the casing for supporting the fishing rod and serving as rod fulcrum whereby upon the biting of a fish, the micro switch will be triggered to actuate the electromagnet switch to lower the rod clamp to automatically raise the fishing rod for hooking up the biting fish and to sound the alarm for warning the fisherman to hold the fishing rod to pick up the hooked fish.

7 Claims, 6 Drawing Figures

AUTOMATIC FISHING MACHINE

BACKGROUND OF THE INVENTION

U.K. Pat. No. GB 2100101B earlier invented by the present inventor taught a fishing kit comprising a portable case which includes a foot operated fishing rod trigger, the case having a removable cover which supports the trigger, wherein four foldable and adjustable legs on the camera of the case enable it to be converted to a sitting platform and the foldable and adjustable legs each associated with connecting rods enable the cover to serve as a foot rest which rest also serves to position the trigger on a sloping or a flat bank, the trigger comprising a pivotal rocking arm for supporting a fishing rod, a control cable connecting this arm to a control rod which is associated with foot-operated pedals. Such a fishing kit can be used to suddenly raise the fishing rod when the fish bites the bait by foot depression on the trigger, which however has the following defects:

1. The trigger must be operated by the fisherman and the raising of fishing rod when bitten by a fish can not be operated automatically. The fisherman must always monitor the fishing rod to be easily tired.

2. The fishing rod resting the supporting arm will be easily pulled by a biting fish to cause loss of the fisherman.

3. No alarm sounding is provided to remind the fisherman, who must therefore always care whether a fish is biting or not.

4. The fulcrum for supporting the fishing rod is fixedly set on the kit so that the raising of fishing rod by foot depression of the trigger can only raise a limited length of fishing wire, which is not adjustable for fishing different sized fishes.

The present inventor has found the defects of my earlier invented fishing kit and invented the present automatic fishing machine.

SUMMARY OF THE INVENTION

The object of the present invention is to provide an automatic fishing machine including a casing, an actuating means, a rod-biasing means, an alarm and a fulcrum means, wherein the actuating means is started as bitten by a fish to close an electric circuit provided for the actuating means and the alarm, the rod-biasing means will thus be operated to automatically raise the fishing rod to hook up the biting fish by the actuating means and the alarm will be sounding to remind the fisherman to hold the fishing rod to pick up the fish.

DETAILED DESCRIPTION

Figure 1:
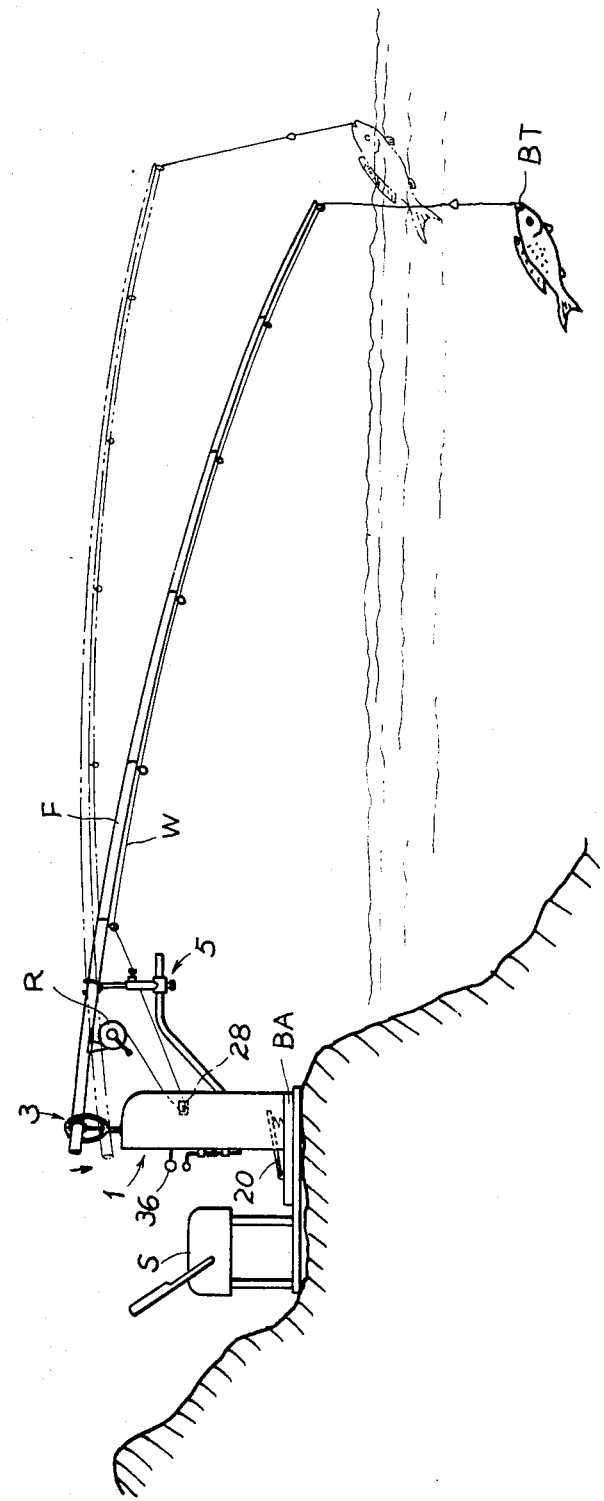
FIG. 1 is an illustration showing the operation of the present invention.
Figure 2:
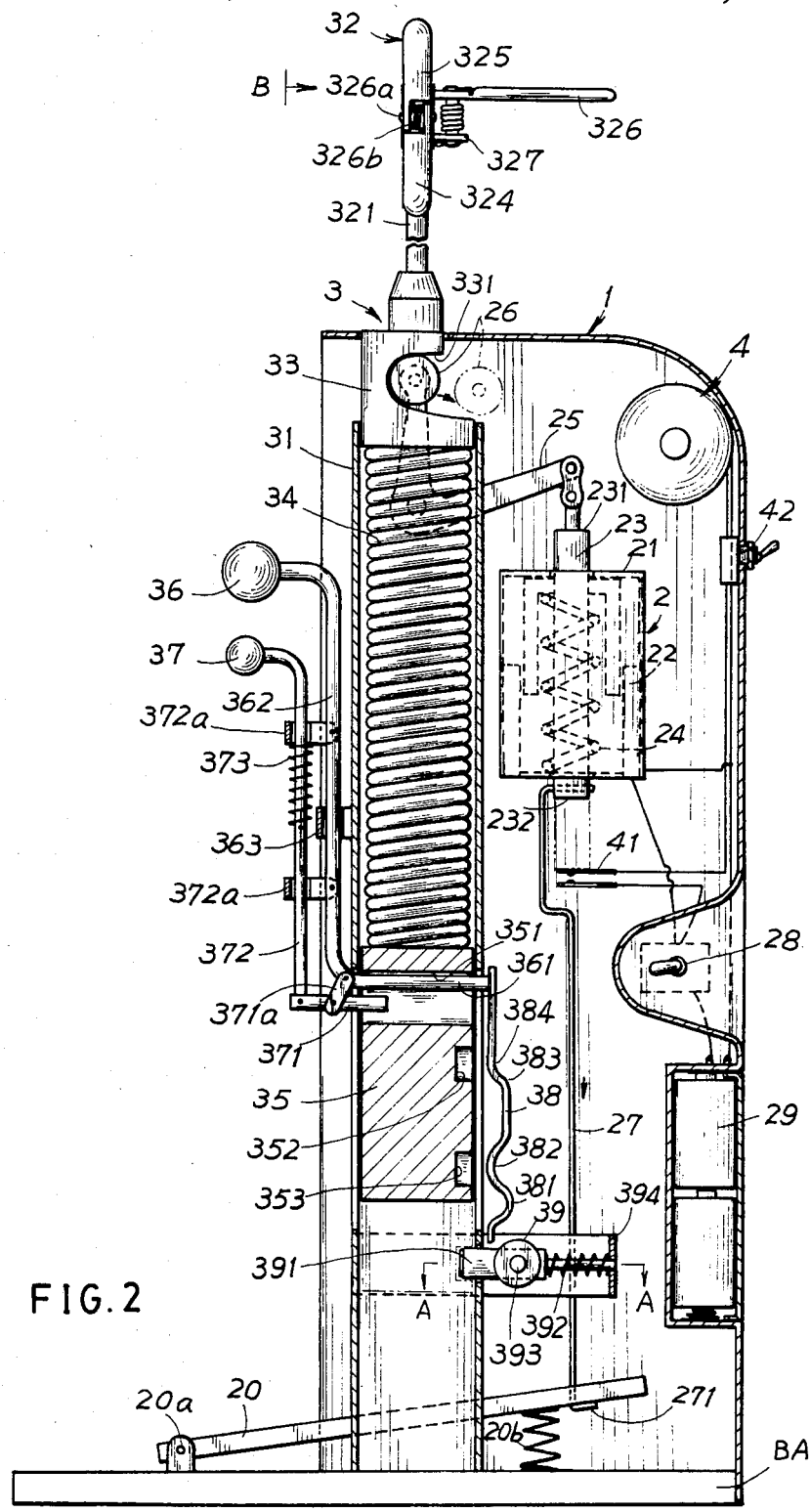
FIG. 2 is a sectional drawing of the present invention.
Figure 3:
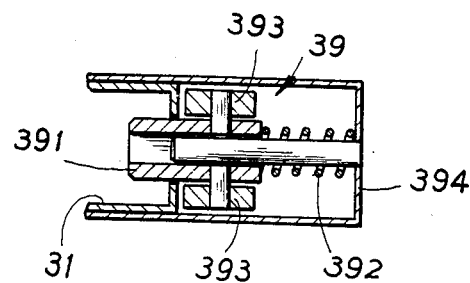
FIG. 3 is a sectional drawing of the spring retainer of the present invention as viewed from AA direction of FIG. 2.
Figure 4:
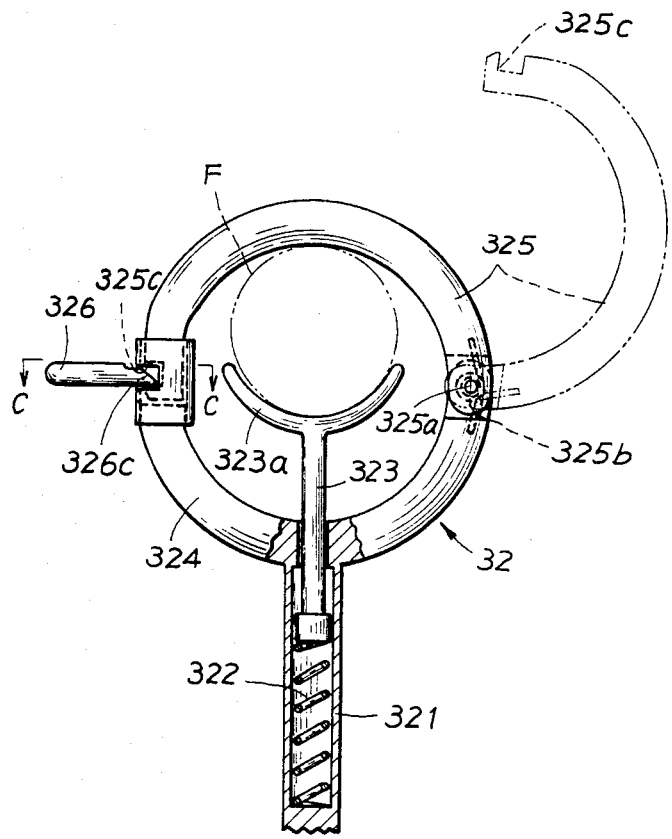
FIG. 4 shows a rod clamp of the present invention as viewed from B direction of FIG. 2.
Figure 5:
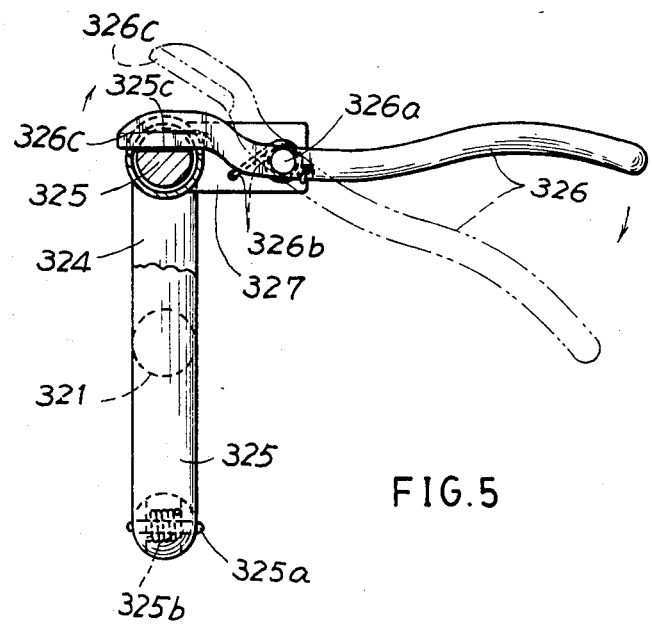
FIG. 5 shows the rod clamp of the present invention as viewed from CC direction of FIG. 4.
Figure 6:
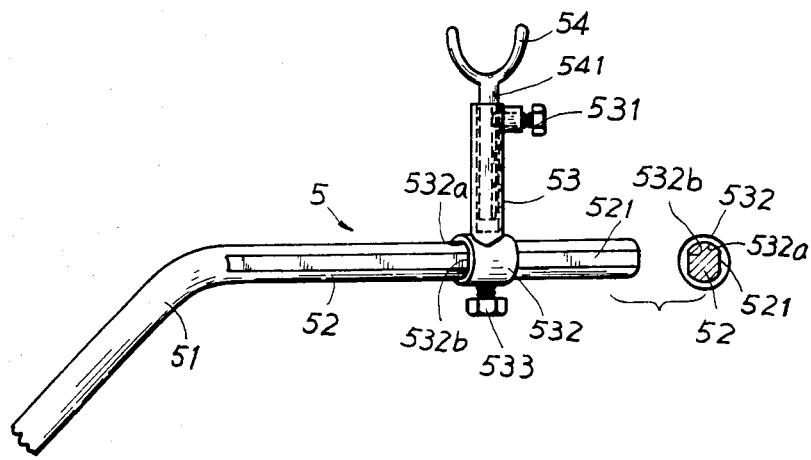
FIG. 6 shows the fulcrum means of the present invention.

As shown in the figures, the present invention comprises a casing 1, an actuating means 2, a rod-biasing means 3, an alarm 4 and a fulcrum means 5.

The casing 1 is mounted on a base BA which is substantially a cover of the fishing kit as disclosed in U.K. Pat. No. GB2100101B granted to the inventor. The seat s is also a part of the case of said U.K. patent.

The actuating means 2, formed within the casing 1, includes an electromagnet switch 21 having a coil 22, a ferrous core 23 and a compression spring 24 in the switch 21, a crank arm 25 pivotedly connected on the upper portion 231 of the ferrous core 23 and having a locking wheel 26 pivotedly connected on the upper end of the crank arm 25, a link 27 secured to the lower portion 232 of the core 23 and formed with a hook 271 on the lower end of the link 27 which is manually depressed by a pedal 20 pivotedly formed on the base BA by a pivot 20a and restored by a spring 20b under the pedal, a normal-open micro switch 28 extending outwards from the casing 1 and a power source 29 electrically connected with switch 28 and switch 21.

The rod-biasing means 3, formed in the rear side of casing 1, includes a guiding jacket 31, a rod clamp 32, an upper block 33, a tension spring 34, a lower block 35, a control lever 36, a resilience variator 37, a spring retainer 39 and a retainer clutch 38.

The guiding jacket 31 is longitudinally formed in the rear side of casing 1 and is made with a hollow portion for movably inserting the upper block 33, the lower block 35 and the tension spring 34 connected between the two blocks 33, 35. The upper block 33 is formed with a recess portion 331 to engage with the locking wheel 26 provided on the actuating means 2. The lower block 35 is transversely formed with a through hole 351, and formed with an upper latch hole 352 and a lower latch hole 353 on its one side. The control lever 36 includes a hook rod 361 passing the through hole 351 and a vertical lever 362 vertically moving within a bracket 363 fixed on the jacket 31. The resilience variator 37 includes a latch 371 pivotely secured to the lower portion of control lever 36 by a connecting link 371a, and a vertical lever 372 vertically moving within two brackets 372a fixed on the control lever 36, and a restoring spring 373 resiliently tensioning the lever 372 to normally protrude the latch 371 into the through hole 351.

The spring retainer 39 includes a locking latch 391 resiliently engaging with either of the upper latch hole 352 or the lower latch hole 353, a spring 392 backing the latch 391, two rollers 393 pivotedly fixed on the rear portion of the latch 391 and a bracket 394 fixing the retainer 39 on the jacket 31. The retainer clutch 38 is secured to the outer end of the hook rod 361 for engaging or disengaging the latch 391 with or from either latch hole 352 or 353, and includes a first extension portion 381, a first recess portion 382 neighbored to the first extension portion 381, both formed on the lower portion of the clutch 38; and a second extension portion 383, a second recess portion 384 neighbored to the second extension portion 383, both formed on the upper portion of the clutch 38.

The rod clamp 32 includes a supporting tube 321 fixed atop on the upper block 33, a spring 322 jacketed in the tube 321, a rod holder 323 resiliently held within the tube 321 and having an arched bar 323a formed atop on the holder 323, a lower half-ring 324 fixed on the supporting tube 321, an upper half-ring 325 pivotedly secured to the lower half-ring 324 by a pin 325a and resiliently held on the lower half-ring 324 by a spring 325b and formed with a groove 325c on the open end of the ring 325, and a handle 326 pivotedly formed on a bracket 327 extending from the lower half-ring 324 by a pin 326a and having an inner end 326c resiliently engaging with the groove 325c of the upper half-ring 325 by a spring 326b to resiliently clamp the grip portion of fishing rod F between the arched bar 323a of rod holder 323 and the uper half-ring 325.

The alarm 4 may be a buzzer, capable of alarm sounding, and includes a manual switch 42 and a normal-open contactor switch 41 electrically connected with a micro-switch 28 and the power source 29.

The fulcrum means 5 includes an inclined rod 51 formed on the front portion of casing 1, a horizontal rod 52 extending outwards from inclined rod 51, a vertical pipe 53 movably mounted on the horizontal rod 52, and a bifurcated fulcrum rod 54 jacketed in the hollow portion of the pipe 53. The horizontal rod 52 is formed with two longitudinal flat portions 521 on the two opposite sides of the rod 52. The vertical pipe 53 includes an adjusting screw 531 adjustably fixing the rod 54 within the pipe 53, a collar 532 formed on the lower portion of the pipe and having a rod hole 532a movably engaging with the rod 52 and having two flat portions 532b on the two opposite sides of the hole 532a corresponding to the two flat portions 521 on rod 52, and a screw 533 adjustably fixing the collar 532 on the rod 52. Such a fulcrum means 5 will serve as a fulcrum for supporting the fishing rod F as shown in FIG. 1. The rod portion 541 of fulcrum rod 54 is vertically adjusted in the pipe 53 and the pipe 53 is horizontally adjusted on the rod 52 to adjust the stroke of fishing wire w when raising the rod F as bitten by a fish.

When using the present invention, the grip portion of fishing rod F is clamped by the rod clamp 32 and the control lever 36 is raised to allow the recess portion 331 of upper block 33 engaging with the locking wheel 26 of the actuating means 2. The fishing rod F is supported by the fulcrum means 5 and fishing wire W is wound around switch 28 when pulled between the reel R and bait BT as shown in FIG. 1. Then, the control lever 36 is lowered to allow the locking latch 391 engaged with the lower latch hole 353 of the lower block 35 and to tension the spring 34. When the fish bites the bait BT, the micro switch 28 is triggered to actuate electromagnet switch 21 to attract the arm 25 and wheel 26 downwards, whereby the clamp 32 will be suddenly lowered by the tension spring 34 to automatically biase the fishing rod F to hook up the biting fish. Meanwhile, the lower portion 232 of core 23 will close the contactor switch 41 of the alarm 4 to cause alarm sounding to remind the fisherman to raise the fishing rod F and pick up the hooked fish. Upon the gripping of fishing rod, the handle 326 of the clamp 32 will also be gripped to disengage its inner end 326c from the upper half-ring 325 so that the fishing rod F can be removed from the resiliently opened half ring 325 from the original clamping position as clamped by the upper half ring 325 and the rod holder 323.

A manual switch 42 can be switched off to stop the sounding of alarm 4. If the power failure is caused, the pedal 20 can be depressed by foot to pull the link 27 to lower the arm 25 and locking wheel 26 as aforementioned for manual operation of the present invention.

If the fishing rod is heavier and bigger, the resilience variator 37 can be pulled upwards to release the latch 371 from the hole 351 and then, the control lever 37 is lowered to allow the upper latch hole 352 engaged with the latch 391 of spring retainer 39 so as to extend the spring for a larger resilience force.

When the first recess portion 382 of the retainer clutch 38 engages with the rollers 393 of retainer 39, the latch 391 is sharply engaged with the lower latch hole 353 of lower block 35 for obtaining the smaller tension force of spring 34 as retained between the upper wheel 26 and the lower retainer 39. If for obtaining larger tension force of the spring 34, the variator 37 is raised to release the latch 371 from hole 351 and the control lever 36 is further lowered to descend the lower block 35 and the clutch 38 until the upper latch hole 352 engaging with the latch 391 of retainer 39, whereby the second recess portion 384 is engaged with the rollers 393. When raising the control lever 36 and the clutch 38 ready for next biasing operation of fishing rod, the first extension portion 381 and second extension portion 383 will pressurize the rollers 393 to retract the latch 391 from its engagement with the relevant latch hole 353 or 352 so that the lower block 35 and the lever 36 can be raised. In order to allow the up-and-down movement of the clutch 38 to prevent obstruction by the latch 391, a longitudinal slit (not shown) is centrally cut on the clutch.

The present invention has the following advantages:
1. Whenever a fish bites the bait, the rod-biasing means may automatically raise the fishing rod to prevent escape of the biting fish.
2. The alarm will be sounding to warn the fisherman to pick up the fish without continuous monitoring the fishing rod during fishing.
3. The clamp 32 wil prevent the rod F from being removed by the biting fish.
4. The resilience variator 37 may adjust the tension spring for the rod-biasing means 3 for raising heavier fishing rod.
5. The fulcrum means 5 can be adjusted either horizontally or vertically, adapted for the pulling stroke of the fishing wire for hooking up different sized fishes.

I claim:
1. An automatic fishing machine comprising:
a casing (1) mounted on a base BA:
an actuating means (2) formed in said casing (1) and including an electromagnet switch (21), electrically connected with a normal-open microswitch (28) and a power source (29);
a rod-biasing means (3) formed in the rear side of said casing (1) and including a rod clamp (32) for clamping the grip of the fishing rod (F) and operated by said actuating means (2) to raise said fishing rod when bitten by a fish;
an alarm (4) including a manual switch (42) and a contactor switch (41) electrically closed by said electromagnet switch (21), and electrically connected with said micro switch (28) and said power source (29);
and a fulcrum means (5) formed on the front portion of said casing (1) for supporting said fishing rod (F) and serving as a fulcrum for said rod (F), wherein said micro switch (28) of said actuating means (2) wound by the fishing wire (W) between the reel (R) and the bait (BT) will be triggered to actuate the electromagnet switch (21) to operate said rod-biasing means (3) to automatically raise the fishing rod (F) for hooking up the biting fish, and to sound the alarm (4) to remind the fisherman to hold the fishing rod to pick up the hooked fish.

2. An automatic fishing machine according to claim 1, wherein said actuating means (2) includes an electromagnet switch (21) having a coil (22), a ferrous core (23) and a compression spring (24) therein, a crank arm (25) pivotedly connected on the upper portion (231) of said core (23) and having a locking wheel (26) pivotedly connected on the upper end of said arm (25), a link (27) connected on the lower portion (232) of said core (23) and having a hook (271) formed on the lower end of said link (27), a normal-open micro switch (28) and a power source (29).

3. A fishing machine according to claim 2, wherein said hook (271) of said link (27) is depressed by a pedal (20) pivotedly formed on the base (BA) for manual operation of said actuating means (2) and said rod-biasing means (3).

4. A fishing machine according to claim 2, wherein said rod-biasing means (3) includes: a guiding jacket (31) formed in the rear portion of said casing (1) and formed with a hollow portion therein, an upper block (33) having a recess portion (331) engaged with said locking wheel (26), a lower block (35) transversely formed with a through hole (351), and formed with an upper latch hole (352) and a lower latch hole (353) on its one side, a tension spring (34) secured between said two blocks (33, 35) to be movably jacketed in the hollow portion of said jacket (31), a rod clamp (32) fixed atop on said upper block (33), a control lever (36) having a hook rod (361) formed on its lower portion and passing said through hole (351) of said lower block (35) and having a vertical lever (362) vertically moving within a bracket (363) fixed on the jacket (31), a resilience variator (37) having a latch (371) pivotedly secured to the lower portion of said control lever (36) and a vertical lever (372) vertically moving within two brackets (372a) fixed on said control lever (36) and a restoring spring (373) resiliently tensioning said lever (372) to normally protrude said latch (371) into said through hole (351), a spring retainer (39) having a locking latch (391) resiliently engaging with either of the latch hole (352 or 353), a spring (392) backing said latch (391), two rollers (393) pivotedly fixed on said latch (391) and a bracket (394) fixing said retainer (39) on said jacket (31), and a retainer clutch (38) secured to the outer end of said hook rod (361) of said control lever (36) for engaging or disengaging said locking latch (391) with or from either said latch hole (352 or 353).

5. A fishing machine according to claim 4, wherein said retainer clutch (38) includes a first extension portion (381), a first recess portion (382) neighbored to said first extension portion (381), both formed on the lower portion of said clutch (38); and a second extension portion (383), a second recess portion (384) neighbored to said second extension portion (383), both formed on the upper portion of said clutch (38), whereby, when lowering said control lever (36) to allow said first recess portion (382) engaged with said rollers (393), said latch (391) will engage with said lower latch hole (353) for obtaining the smaller tension force of said spring (34), and when still lowering said lever (36) to allow said second recess portion (384) engaging with said rollers (393), said latch (391) will engage with said upper latch hole (352) for obtaining larger tension force of said spring (34), said two extension portions (381, 383) capable of retracting said roller (393) to release the engagement of said latch (391) with either latch hole (352 or 353) for raising said lever (36) for next biasing operation of fishing rod.

6. A fishing machine according to claim 4, wherein said rod clamp (32) includes a supporting tube (321) fixed atop on said upper block (33), a rod holder (323) having an arched bar (323a) resiliently held in said tube (321), a lower half-ring (324) fixed on said tube (321), an upper half-ring (325) resiliently held on said lower half-ring (324) and having a groove (325c) on its open end, and a handle (326) pivotedly formed on a bracket (327) extending from the lower half-ring (324) and having an inner end (326c) resiliently engaging with said groove (325c) of said upper half-ring (325) to thereby resiliently clamp the fishing rod (F) between said arched bar (323a) and said upper half-ring (325), or to resiliently open said upper half-ring (325) for holding said fishing rod (F) when gripping said handle (326) to disengage said inner end (326c) of handle (326) from said groove (325c) of said upper half-ring (325).

7. A fishing machine according to claim 1, wherein said fulcrum means (5) includes an inclined rod (51) formed on the front portion of said casing (1), a horizontal rod (52) extending outwards from said inclined rod (51), a vertical pipe (53) having a collar (532) formed on the lower portion thereof to be adjustably mounted on said horizontal rod (52), and a bifurcated fulcrum rod (54) vertically and adjustably fixed within said pipe (53) for supporting said fishing rod (F) and serving as a fulcrum therefor.

* * * * *